(12) United States Patent
Seifi et al.

(10) Patent No.: US 10,009,613 B2
(45) Date of Patent: Jun. 26, 2018

(54) METHOD, SYSTEMS AND APPARATUS FOR HDR TO HDR INVERSE TONE MAPPING

(71) Applicant: THOMSON LICENSING, Issy les Moulineaux (FR)

(72) Inventors: Mozhdeh Seifi, Thorigne Fouillard (FR); Erik Reinhard, Hédé-Bazouges (FR)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days. days.

(21) Appl. No.: 15/230,913

(22) Filed: Aug. 8, 2016

(65) Prior Publication Data

US 2017/0048520 A1    Feb. 16, 2017

(30) Foreign Application Priority Data

Aug. 13, 2015    (EP) .................................. 15306293

(51) Int. Cl.
*H04N 19/172* (2014.01)
*H04N 19/103* (2014.01)
*H04N 19/136* (2014.01)

(52) U.S. Cl.
CPC ......... *H04N 19/172* (2014.11); *H04N 19/103* (2014.11); *H04N 19/136* (2014.11)

(58) Field of Classification Search
CPC .. H04N 19/105; H04N 19/126; H04N 19/134; H04N 19/186
See application file for complete search history.

(56) References Cited

U.S. PATENT DOCUMENTS

2006/0104508 A1    5/2006    Daly et al.
2015/0117791 A1*   4/2015    Mertens ............... H04N 19/176
                                                        382/239

FOREIGN PATENT DOCUMENTS

WO    WO2015007505    1/2015
WO    WO2015077329    5/2015

OTHER PUBLICATIONS

Gryaditskaya et al., "Motion Aware Exposure Bracketing for HDR Video", Computer Graphics Forum—TOC, vol. 34, No. 4, Jul. 27, 2015, pp. 119-130.

* cited by examiner

*Primary Examiner* — Ruiping Li
(74) *Attorney, Agent, or Firm* — Brian J. Dorini; Lily Neff

(57) ABSTRACT

The present invention proposes to provide methods, apparatus and systems for inverse tone mapping of a high dynamic range image. The method may include the operations of obtaining a luminance component of the high dynamic range image. The method may further include determining an HDR to HDR inverse tone mapper operator. The method may further include determining a tone expanded image by applying the HDR to HDR inverse tone mapper to the luminance component of the high dynamic range image. The method may further include wherein the HDR to HDR inverse tone mapper curve comprises a linear part for dark and mid-tone levels, and an expanding non-linear part for highlights. The system or apparatus may be configured to perform the operations of the method.

20 Claims, 8 Drawing Sheets

METHOD, SYSTEMS AND APPARATUS FOR HDR TO HDR INVERSE TONE MAPPING

This application claims the benefit, under 35 U.S.C. § 119 of European Patent Application No. 15306293.0, filed Aug. 13, 2015.

TECHNICAL FIELD

The present disclosure relates to image and video processing. In particular, the present disclosure relates to conversion of image or video data utilizing a High Dynamic Range ("HDR") inverse tone mapping operator.

BACKGROUND

Light in nature covers an enormous range of luminance levels, from starlight to bright sunlight. Yet traditional imaging technologies, both digital and analog, offer diminished experience because they cannot parallel the wide range of luminance and contrast that is visible to human eyes. In response, HDR technologies are being developed to allow for the display of an extended range of color, luminance and contrast. HDR technologies focus on capturing, processing and displaying content of a wider dynamic range. Although there are HDR displays, and although cameras capable of capturing an increased dynamic range are being developed, there is still very limited HDR content available.

To prepare conventional content for HDR displays, reverse or inverse tone mapping operators (ITMO) can be employed in connection with algorithms to process the luminance information in an image with the aim of recovering or recreating the appearance of the image's original scene. Typically, ITMOs take a conventional image as input (e.g., a standard dynamic range ("SDR") image), expand the luminance range of the image in a non-linear manner, and process highlights or bright regions locally to enhance the HDR appearance of the resulting image.

Existing ITMO solutions focus on perceptually reproducing the appearance of an original scene and rely on strict assumptions about the image's content. Existing ITMO solutions are rarely created with video in mind and they do not provide sufficient controls to be used within a color grading context.

Existing ITMO solutions are problematic because they increase the range of luminance values by a very large amount. The difference between light levels observed in the real world and the input (normally around 100 nits) is very significant, forcing the design of appropriate ITMOs to make trade-offs between visual quality and computational complexity. For example, existing ITMOs enlarge a very low range of legacy non-HDR content (e.g., 100 nits content), into a full luminance channel information (e.g., maximum 4000 nits content).

In some cases, however, the ITMO is required to enlarge the range by a significantly smaller factor, e.g., from a maximum of 1500 nits to 4000 nits (e.g., for range expansion between different HDR displays). This fits with the currently observed trend that display devices have a dynamic range that is increasingly less uniform. With a large variety of displays with different capabilities deployed, content providers will not be able to provide separate grades for each different display.

SUMMARY OF INVENTION

An aspect of present principles is directed to re-mastering SDR (standard dynamic range) video content to HDR content, e.g., in the context of a color grading workflow. To achieve a gentle dynamic range expansion, there is a need for a solution that correctly reproduces the intent of the provider, including maintaining a high peak luminance even if the peak luminance is higher than the peak luminance of the received content.

The present invention proposes to provide methods, apparatus and systems for inverse tone mapping of an HDR image. The method may include the operations of obtaining a luminance component of the HDR image. The method may further include determining an inverse tone mapper curve. The method may further include determining a tone expanded image by applying the HDR to HDR inverse tone mapper curve to the luminance component of the HDR image. The method may further include wherein the HDR to HDR inverse tone mapper curve comprises a linear part for dark and mid-tone levels, and an expanding non-linear part for highlights. The systems or apparatus may be configured to perform the operations of the method.

The method, apparatus or system may include wherein the HDR to HDR inverse tone mapper includes a threshold for determining when the luminance is changed linearly and when the luminance is non-linearly decompressed.

The method, apparatus or system may include operations for determining the threshold based on content.

The method, apparatus or system may include wherein a final threshold $\tau_f$ is determined based on the following:

$$\tau_f = \begin{cases} \tau & \rho \leq n \\ \dfrac{\tau}{\alpha - n}(\alpha - \rho) & n < \rho \leq \alpha \\ 0 & \rho > \alpha \end{cases}$$

The method, apparatus or system may include criteria to enforce continuity and smoothness of the HDR to HDR inverse tone mapper curve.

The method, apparatus or system may include wherein the HDR image is part of an HDR video, and wherein the application of the HDR to HDR inverse tone mapper curve includes applying information from prior video frames to achieve temporal stability.

The method, apparatus or system may include wherein the information from prior video frames is applied using leaky integration based on the threshold.

The method, apparatus or system may include signaling information representative of the HDR to HDR inverse tone mapper curve. The signaling may be performed using at least one syntax element included in at least one of a Picture Parameter Set (PPS), a Sequence Parameter Set (SPS), a Supplemental Enhancement Information (SEI) message, a Video Usability Information (VUI), Consumer Electronics Association (CEA) message, and a header.

In another example, the present principles further provide for methods, apparatus or system for tone mapping an HDR image. The method may include obtaining a luminance component of the HDR image; determining an HDR to HDR inverse tone mapper curve; determining a tone decompressed image by applying the HDR to HDR inverse tone mapper curve to the luminance component of the high dynamic range image; wherein the HDR to HDR inverse tone mapper curve is multi-segmented, and wherein the multi-segmented curve includes at least a segment that is not linear and at least a segment that is linear. The system or apparatus may be configured to perform the operations of the method.

The method, apparatus or system may include wherein the linear segment is directed to at least one selected from a group of darks, mid-tones, and highlights, and wherein the non-linear segment is directed to at least one selected from a group of darks, mid-tones, and highlights.

In another example, the present principles further provide for methods, apparatus or system for tone mapping an HDR image. The method may include obtaining a luminance component of the HDR image; determining an HDR to HDR inverse tone mapper curve; determining a tone decompressed image by applying the HDR to HDR inverse tone mapper curve to the luminance component of the HDR image; wherein the parameters of the HDR to HDR inverse tone mapper curve are linearly or non-linearly modulated as a function of the threshold to satisfy predefined conditions.

BRIEF SUMMARY OF THE DRAWINGS

The features and advantages of the present invention may be apparent from the detailed description below when taken in conjunction with the Figures described below.

DETAILED DESCRIPTION

Figure 1:
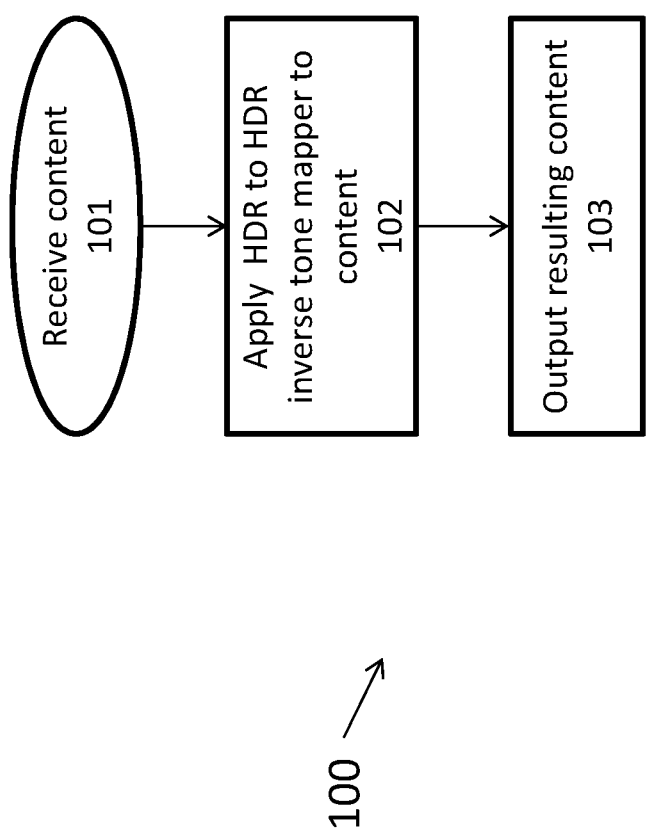
FIG. 1 is a diagram depicting an exemplary method for applying an HDR to HDR inverse tone mapper in accordance with present principles.

The present principles are directed to methods, apparatus and systems for HDR to HDR inverse tone mapping and/or an HDR to HDR inverse tone mapper.

An aspect of present principles may be implemented in hardware such as Field Programmable Gate Arrays (FPGAs) and Systems on Chip (SoCs), although it could be implemented without restriction in other types of hardware such as general purpose processing units and graphics processing units. The minimal processing capabilities of FPGAs and SoCs, combined with the increasing need for processing due to higher frame resolutions (such as UHD or 4K content) as well as higher frame rates, may limit the processing that can be implemented on such devices. The present principles address the problem of inverse tone reproduction in a manner consistent with such potential device limitations.

An aspect of present principles is directed to tone reproduction and inverse tone reproduction that may be used as part of an encoding/decoding scheme. For example, HDR video may be processed by a tone reproduction operator, serving the role of an opto-electrical transfer function (OETF). The resulting video can then be passed to the encoder, including but not limited to AVC or HEVC. The encoded bitstream may then be transmitted to the recipient, where the corresponding decoder is applied. The inverse OETF (often referred to as the electro-optical transfer function (EOTF)) may then be applied to the decoded content, resulting in the reconstruction of the HDR video.

An aspect of present principles addresses the problem of diminishing quality of a dynamic range of HDR content when content is converted to a target display. An aspect of present principles relates to reproducing an HDR sensation despite the expansion required to fit content into a target display range.

An aspect of present principles relates to methods, apparatus and systems for maintaining quality of displayed HDR content similar to the quality at a source, while expanding the HDR content only for very high ranges of information. Even though input content may have a lower dynamic range than the range of output displays, the sensation of viewing HDR content may still exist. This may also enable maintaining a director's intent. For example, content graded on a 4000 nit reference display and compressed into the range of 1000 nits would have a high quality reproduction for display on 4000 or 1500 nit consumer displays.

An aspect of present principles is directed to an HDR to HDR inverse tone mapping operator that may be utilized in various applications. For example, the HDR to HDR inverse tone mapping operator may be utilized in a post-production studio, to aid in the re-grading process or to produce a secondary grade with a higher peak luminance. Alternatively, on the consumer side, the HDR to HDR inverse tone mapping operator could be incorporated into an HDR consumer display or could be integrated into a set-top box.

An aspect of present principles relates to a HDR to HDR inverse tone mapper's determination that either changes dark and mid-tone levels linearly or does not change the mid-tone levels. This may preserve the intent of a photographer, an artist or a producer. The HDR to HDR inverse tone mapper may be applied to a luminance channel, and may correct chromatic information secondarily.

An aspect of present principles relates to determining a threshold $\tau$ for a luminance channel. After determining threshold $\tau$, input values for the luminance channel are changed linearly when the input values are lower than (or lower than equal to) the threshold $\tau T$. The input values lower than the threshold hold value may be changed linearly based on a scaling factor s. The scaling factor s may also be set to s=1, thereby keeping the input values unchanged for a corresponding luminance value range. An aspect of present principles relates to expanding very high luminance values (e.g., luminance values larger than or larger than and equal to threshold $\tau$) using a variation of an inverse tone mapper. An aspect of present principles is directed to an HDR to HDR inverse tone mapper that can be represented by a continuous curve, with a smooth profile transition around the threshold value $\tau$.

An aspect of present principles relates to a preliminary color transformation that determines the luminance channel information based on RBG values. An aspect of present principles further relates to determining the design for an inverse tone mapper by introducing the conditions on the inverse tone mapping curve. An aspect of present principles relates to determining the threshold $\tau$ from the content itself.

Preliminary Color Transformation

An aspect of present principles relates to determining luminance information for each pixel based on a transformation of content (e.g., decoded content). In one example, the content may be formatted for a standard RGB color space. In one example, if the content is given in the sRGB color space, the calculation of a luminance value for a pixel I is given by:

$$I^i = 0.2126 \times R^i + 0.7152 \times G^i + 0.0722 \times B^i$$ Equation No. 1:

Luminance values can be derived from other RGB color spaces in a similar manner, however the constants in Equation No. 1 will then be different. The constants of Equation No. 1 may depend on the definition of the RGB color space. Examples of RGB color spaces include ISO RGB, Extended ISO RGB, scRGB, Adobe RGB 98, Adobe Wide Gamut RGB, Apple RGB, ROMM RGB, ProPhoto RGB, CIE (1931) RGB, as well as RGB spaces defined in standards ITU-R Rec. BT 709, ITU-R Rec. BT 2020, ITU-R Rec. BT 470, SMPTE RP 145, and SMPTE 170M.

Alternatively, the luminance channel of any appropriate color space, such as Yuv, Yu'v', YCbCr, YPbPr, Y'DbDr, Y'CC, CIE Yxy, CIE Lab, CIE Luv, CIE LCh, IPT, Y'I'Q', EBU Y'U'V' may be utilized. The image may be transformed into such a color space. Further processing may be then applied to the luminance channel of the transformed image. A further color space transform may then convert the image to a destination color space (which may be an RGB color space).

Inverse Tone Mapper Variation

An aspect of present principles is directed to an HDR to HDR inverse tone mapping algorithm that expands luminance values based on a determination that the luminance values are greater than (or greater than or equal to) a fixed threshold. In one example, the threshold may be determined using a slider in a GUI. In another example, the threshold may be provided (along with input content) as metadata. In another example, the threshold can be automatically estimated.

In one example, a C1 inverse tone mapping function is designed for the full range of the input luminance. As used herein, a "C1" function is defined as a function with its first derivative being defined and continuous everywhere in the open interval of the input of the derivative function domain. In other words, the smoothness criterion is not defined at I=0 and I=$I^{max}$.

In one example, $I^{max}$ may be the maximum luminance value of input content and $I_o^{max}$ may be the maximum producible luminance value by the output display. In one example, the values for these variables are $I^{max}$=1500 nits and $I_o^{max}$=4000 nits.

In one example, an inverse tone mapper function may be represented as $\mathcal{J}(I)$. In one example, the inverse tone mapper function is determined based on the inverse of a photographic operator $$\mathcal{J}(I) = \frac{I}{1-I}.$$

An aspect of present principles is directed to an HDR to HDR inverse tone mapper $\mathcal{J}_{new}(I,\tau)$ that linearly scales input values lower than (or lower than or equal to) a threshold $\tau$ by factor s (frequently s=1). The HDR to HDR inverse tone mapper also expands non-linearly input values larger than (or larger than or equal to) a threshold $\tau$ according to a variation of a function $\mathcal{J}$. In one example, the HDR to HDR inverse tone mapper may be defined as:

$$\mathcal{J}_{new}(I, \tau) = \begin{cases} sI & \text{if } I \leq \tau \\ \frac{a(I-\tau)+c}{b(I-\tau)+d} & \text{otherwise} \end{cases}$$ Equation No. 2

In Equation No. 2, the value of b may be preset to 1. The three parameters a, c, d need to be set to satisfy the following three conditions to obtain an C1 inverse tone mapper $\mathcal{J}_{new}(I,\tau)$:

i. The maximum input $I^{max}$ should map to the maximum output $I_o^{max}$, therefore $$\mathcal{J}_{new}(I^{max},\tau)=I_o^{max}$$ Equation No. 3:

ii. At I=$\tau$, the inverse tone mapper needs to be continuous, therefore $$\mathcal{J}_{new}(\tau,\tau)=s\tau$$ Equation No. 4:

iii. Also, at I=$\tau$, the gradient of the inverse tone mapper needs to be continuous, therefore, $$\frac{\partial \mathcal{J}_{new}}{\partial I}(\tau, \tau) = s$$ Equation No. 5

Solving the system of Equation Nos. 3-5 for the three unknowns a, c, d, results into the following:

$$d = \frac{(I^{max}-\tau) \times (s\tau - I_o^{max})}{I_o^{max} - sI_o^{max}}$$ Equation No. 6

$$c = s\tau d$$ Equation No. 7

$$a = \frac{I_o^{max}(I^{max} - \tau + d) - c}{I^{max} - \tau}$$ Equation No. 8

In one example, the methodology described above in connection with Equation Nos. 2 may be implemented through a Look-Up-Table with the sampled input values and output values for real-time inverse tone mapping.

Figure 6:
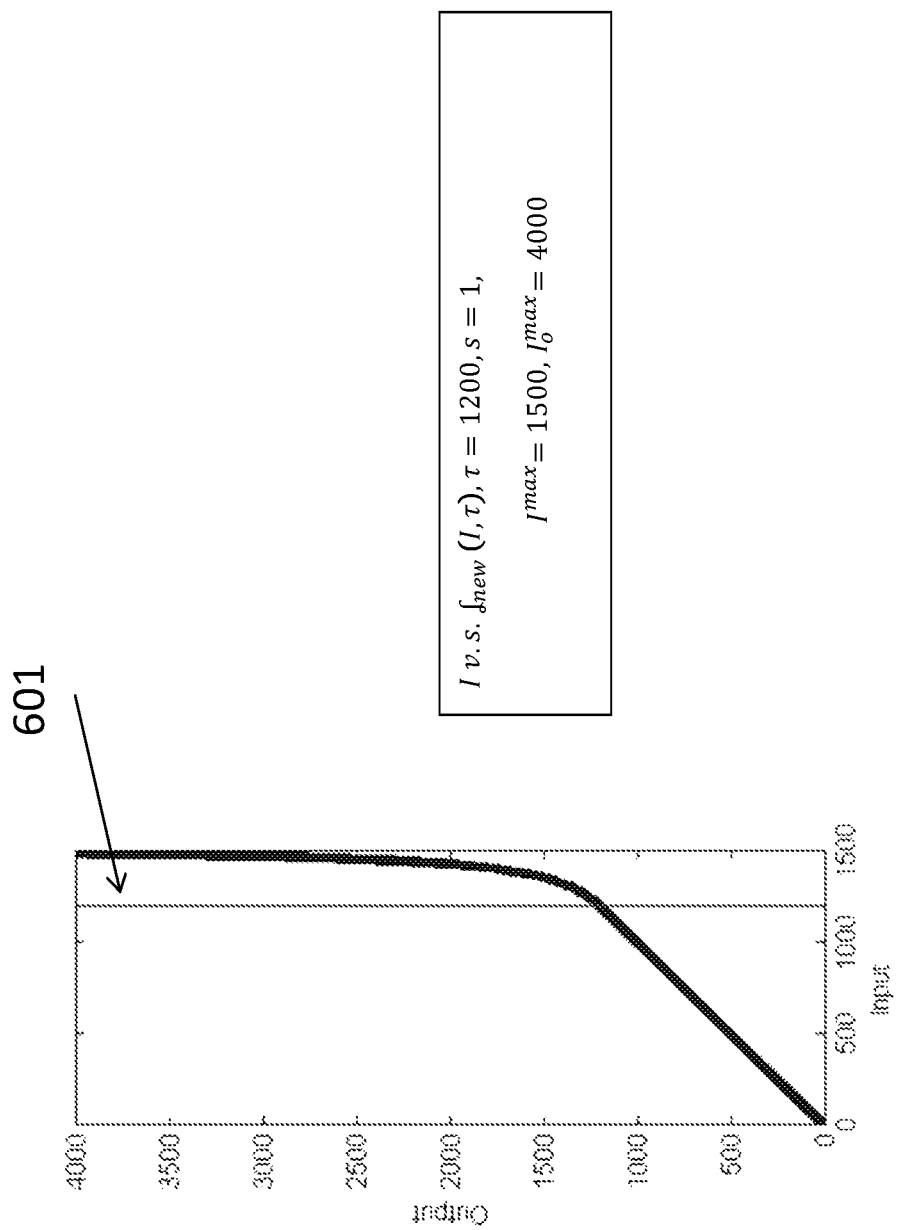
FIG. 6 is a diagram depicting an exemplary plot in accordance with present principles.

FIG. 6 illustrates a plot of I versus $\mathcal{J}_{new}(I,\tau)$. The plot curve of FIG. 6 is determined for=1200, s=1, $I^{max}$=1500, $I_o^{max}$=4000. The threshold $\tau$ is marked by line 601 in FIG. 6. The plot shows the overall behavior of the inverse tone mapper function $\mathcal{J}_{new}(I,\tau)$, illustrating that the behavior is linear in dark and mid-tone levels and non-linear expanding in highlights. It can be easily verified that the curve is indeed a C1 function. For an inverse tone mapper to expand in the non-linear part, the first and second derivatives of the curve should be always positive, meaning that the parameters always satisfy the following conditions: ad−c>0 and (I−$\tau$)+d<0.

Figure 7:
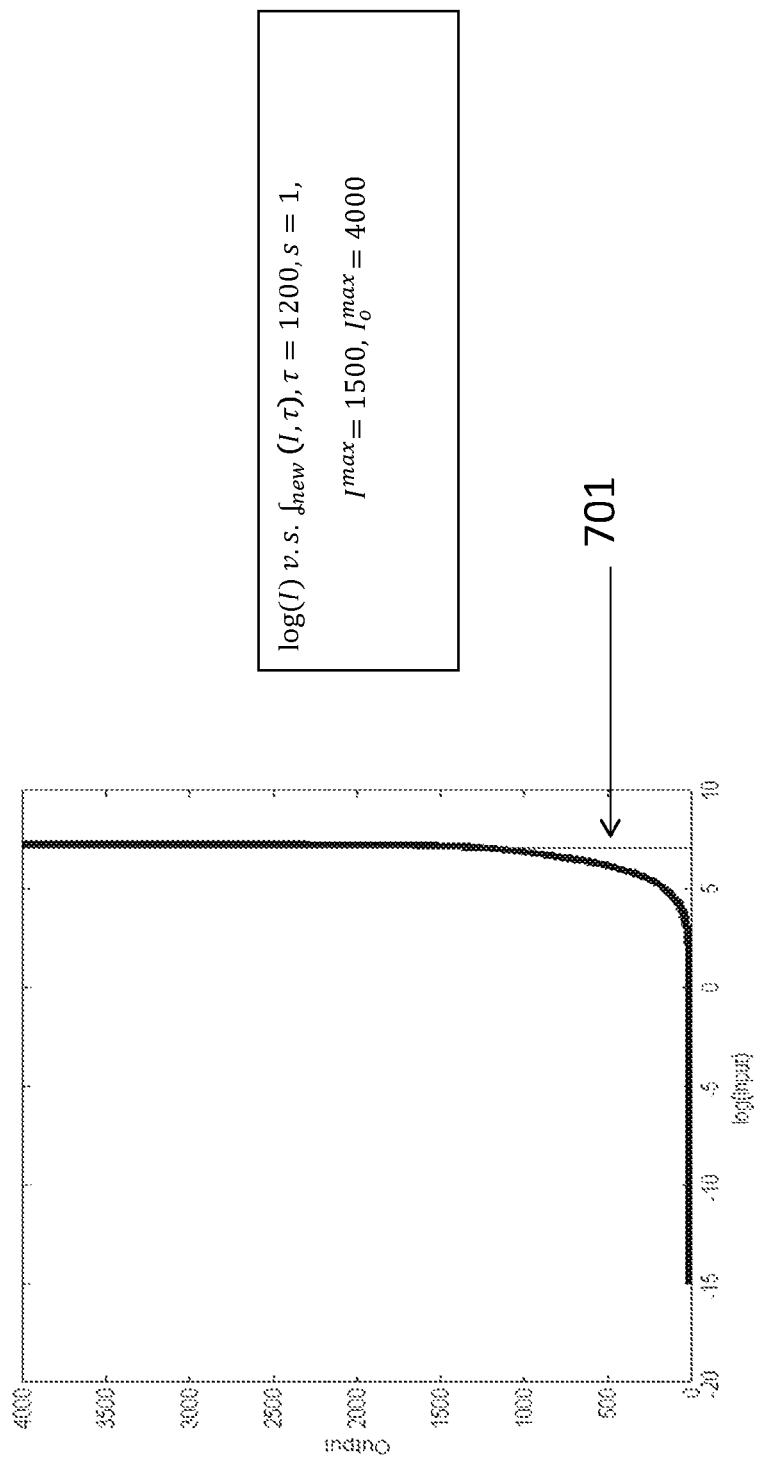
FIG. 7 is a diagram depicting an exemplary plot in accordance with present principles.

FIG. 7 illustrates a plot for log(I) versus $\mathcal{J}_{new}(I,\tau)$. The threshold $\tau$ is marked by line 701 in FIG. 7. This curve shows the inverse tone mapper in logarithmic space.

The plots shown in FIGS. 6 and 7 illustrate the behavior of the inverse tone mapper, i.e., linear in dark and mid-tone levels, and non-linear expanding in the highlights.

Treatment of Low Luminance Values

The method of Equations Nos. 2 to 8 describes an inverse tone mapping approach with a linear segment for the dark parts and the mid-tones of an image. The lightest parts (for instance the highlights) of the image are expanded with a non-linear function. A cross-over point determines the maximum value in the input which is passed through the linear part of the function, and the smallest value of the input which is passed through the non-linear part of the function.

An aspect of present principles is directed to a second cross-over point (or a threshold) that separates the darkest part of the image (the blacks) from the remainder of the image. The blacks can be processed in a non-linear manner, such as when the black-level of the target display device is higher or lower than the black level of the content or the black level of the grading monitor that was used to create the content.

Treatment of the Inverse Tone Mapping Curve Parameters

An aspect of present principles is directed to processing of a curve representing an HDR to HDR inverse tone mapper based on a cross-over point or threshold. In one example, the curve may be modulated based on the cross-over point. The modulation can be linear or non-linear. In one example, the modulation may result in convergence of the parameters of Equation No. 2 to defined values. In one example, the values of parameters a and d may converge to −1, and the value of parameter c converge to 0, when the cross-over point converges to 0. When the cross-over point converges to 0, $\mathcal{J}_{new}(I,\tau)$ converges to $\mathcal{J}(I)$.

Setting Threshold τ
Image Content

An aspect of present principles is directed to determining, based on a threshold τ, a maximum value for an input $I^i$ for which input HDR content is only processed resulting in an output $I_o^i$. In one example, the value of the threshold τ is large enough to cover more than (100−n) % of the pixels of the content (in one example n=2), and smaller than 100 η% of $I^{max}$ (in one example η=0.8 of the peak input luminance), in order to prevent over-expanding very high input luminance values. In one example, for most of natural scenes, very high luminance values contribute to a sparse set of pixels (HDR scene histograms tend to show a highly kurtotic distribution). For such content, less than n % of the pixels (in one example n=2) are expanded from the range of the $I^{max}$ based on the following threshold determination:

$$\tau = \eta \times I^{max} \qquad \text{Equation No. 9:}$$

with an example of η=0.8.

For example, when $I^{max}$=1500 nits, the threshold τ can be initialized to 1200. This choice of η and n has been experimentally shown to result in subjectively pleasant output images.

In one example, a content-dependent threshold τ is determined based on minimum luminance value. The minimum luminance value is based on a determination that less than n % of the pixels have higher luminance values. In other words, the goal is to find the smallest luminance value that has less than n % of the total pixel numbers lie on its right hand side on the histogram.

In one example, the threshold n (which corresponds to the percentage of the pixels that are going to be expanded) is set to 2%. The threshold n determines the number of pixels that are being changed. However, in other examples, the value for the threshold n may be set to any other value. In one example, the value for the threshold n may depend on the type of content or application (e.g., a display device or a content capturing device).

In one example, the content dependent threshold τ (i.e., the knee point in the inverse tone mapping curve) may be determined based on a cumulative histogram of the content. The frequency of input luminance I may be denoted by $h^I$. The value of $h^I$ can be determined by calculating a histogram of the input luminance image with any number of bins. The cumulative histogram for value I is denoted by $c^I$ and can be found through the following:

$$c^I = \Sigma_{s=1}^{I} = h^s \qquad \text{Equation No. 10:}$$

In one example, the final threshold may be set equal to the initial value $\tau_f = \tau$ if:

$$100 \frac{c^{I^{max}} - c^{\tau}}{c^{I^{max}}} \leq n \qquad \text{Equation No. 11}$$

The condition in Equation No. 11 is satisfied when there are less than n % of pixels that fall between τ and $I^{max}$. This allows linearly changing only more than (100−n) % of the pixels. If the condition in Equation No. 11 is not satisfied, the breaking point (i.e., the knee point in the tone mapping curve) is pushed back to increase the range in which the input is expanded.

In one example, the value of ρ is denoted as follows:

$$\rho = 100 \frac{c^{I^{max}} - c^{\tau}}{c^{I^{max}}}, \qquad \text{Equation No. 12}$$

Based on Equation No. 12, the value of a threshold τ may be determined as follows (consisting of linearly reducing $\tau_f$):

$$\tau_f = \begin{cases} \tau & \rho \leq n \\ \frac{\tau}{\alpha - n}(\alpha - \rho) & n < \rho \leq \alpha \\ 0 & \rho > \alpha \end{cases} \qquad \text{Equation No. 13}$$

Figure 8:
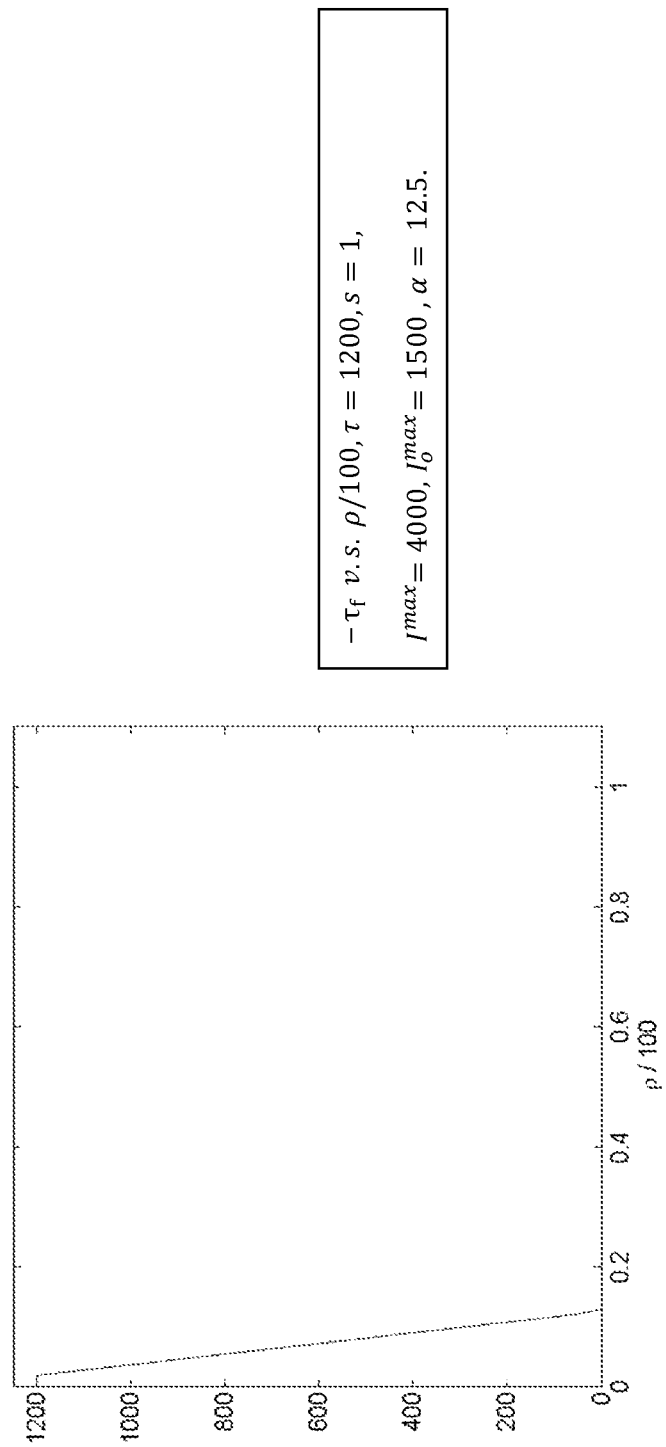
FIG. 8 is a diagram depicting an exemplary plot in accordance with present principles.

In Equation No. 13, the parameter α denotes the maximum percentage of the pixels that can be expanded to only a small part of a dynamic range by the inverse tone mapper $\mathcal{J}_{new}(I,\tau)$ without introducing artifacts. One example of such a curve is shown in FIG. 8, for which α=12.5.

As a consequence, for any choice of α, the value for the final threshold $\tau_f$ for ρ>α is set to 0 (this determination may be performed on an image level, block level, etc.). The value for the final threshold $\tau_f$ is beneficial because more than α % of the pixels are touched if any threshold larger than 0 is chosen. In another example, a threshold τ may be determined based on the determination of the values for $c^{I^{max}}$ and $c^{I^{max}} - c^{\tau}$. In one example, $c^{I^{max}}$ is set to the number of pixels in the image. In one example, $c^{I^{max}} - c^{\tau}$ indicates a number of pixels that have intensities higher than the threshold τ. A fast estimation of $c^{I^{max}} - c^{\tau}$ (and consequently ρ) is obtained by counting the number of pixel intensities that are higher than the threshold τ. The final threshold $\tau_f$ may then be determined based on Equation No. 13.

In the examples above, the final threshold $\tau_f$ depends on image content and is smaller than the initial threshold τ. In one example, when utilized in a decoder, the final threshold $\tau_f$ prevents the expansion of too many pixels into the range of [τ ... $I_o^{max}$] (the range being higher than the content provider intent) and results in an improved visual experience (particularly when compared to the original data).

Leaky Integration of the Threshold τ for Video Content

For video content, thresholds for consecutive video frames can have different values. This may result in undesirable, noticeable variations in the intensity of consecutive video frames ("flicker").

An aspect of present principles addresses the problem of flicker by correcting of a final threshold $\tau_f$ values for various video frames.

In one example, leaky integration can be applied to obtain a parameter $\tau_{new}^{t}$ for a video frame t. The parameter $\tau_{new}^{t}$ may be determined based on a threshold $\tau_{f}^{t}$ (e.g., determined based on Equation No. 13), and an estimated leaky parameter for a previous video frame, i.e., $\tau_{new}^{t-1}$. One example of such determination is:

$$\tau_{new}^{t} = \beta \tau_{f}^{t} + (1-\beta)\tau_{new}^{t-1} \qquad \text{Equation No. 14:}$$

The iterative nature of Equation No. 14 implies that for every video frame, the prior determinations are considered. The user parameter $\beta \in [0\ 1]$ controls the smoothness of $\tau_{new}$ among the video frames. In one example this threshold is received along with the encoded content by a decoder.

Setting Linear Scaling Factor s

An aspect of present principles is directed to determining according to the content the scaling factor s used to inverse tone map luminance values in the dark and mid tones of the image, namely to inverse tone map luminance values inferior to the threshold as defined above.

Preferably, this linear scaling factor s is based on a histogram parameter σ that measures the uniformity of the mid-section of the histogram corresponding to mid-tones and/or on a dynamic range expansion ratio $$\varsigma = \frac{I_o^{max}}{I^{max}}.$$

As a matter of fact, it was found that there exists a correlation between the visual quality of the results obtained by the inverse tone mapping operator, the shape of the histogram of the input images parameterized by σ, and the dynamic range reduction ratio ç.

In one embodiment, we have:

$$s = f(\sigma, \varsigma) = \begin{cases} 1 & \sigma \leq \varrho_1 \\ (-3\sigma^2 + 2\sigma^3 + 1)(1-\varsigma) + \varsigma & \varrho_1 < \sigma < \varrho_2 \\ \varsigma & \sigma \geq \varrho_1 \end{cases}$$

where $\varrho_1 = 0.5$, $\varrho_2 = 0.85$, where σ measures the uniformity of the mid-section of the histogram corresponding to mid-tones. σ is preferably defined as $$\sigma = \frac{\frac{\mu}{v} - \varrho_1}{\varrho_2 - \varrho_1}$$

where μ is the average of the histogram weighted by a weight function which leaves the histogram values for mid-tones unchanged and dramatically reduces the histogram values for dark tones and highlights.

In another embodiment, we have:

$$s = g(\sigma, \varsigma) = \begin{cases} f(\sigma) & \varsigma \geq 0.25 \\ h(k(\sigma, \varsigma)) & \varsigma < 0.25 \end{cases}$$

$$\text{where } h(x) = \begin{cases} 1 & x > 1 \\ \varsigma & x < \varsigma \\ x & \text{otherwise} \end{cases}$$

and $$k(\sigma, \varsigma) = 1.1851 - 4.2647\sigma + 4.7364\varsigma + 4.8278\sigma^2 - 0.8162\sigma\varsigma - 7.4752\varsigma^2 - 1.8109\sigma^3 + 1.5458\sigma^2\varsigma - 36.4777\sigma\varsigma^2 + 91.2090\varsigma^3$$

The values of the constants shown in the equations above are for illustrative purposes, and may be determined depending of the type of content.

Color Reconstruction

An aspect of present principles is directed to deriving luminance values from RGB pixel values according to Equation No. 1. To reconstruct an inverse tone mapped color image, a simple pixel-wise approach may be utilized. The pixel-wise approach scales RGB values according to a scale change in a luminance channel, as follows:

$$R_{out}^{i} = f_{new}(I^{i}, \tau)\frac{R^{i}}{I^{i}} \qquad \text{Equation No. 15a}$$

$$G_{out}^{i} = f_{new}(I^{i}, \tau)\frac{G^{i}}{I^{i}} \qquad \text{Equation No. 15b}$$

$$B_{out}^{i} = f_{new}(I^{i}, \tau)\frac{B^{i}}{I^{i}} \qquad \text{Equation No. 15c}$$

The reconstruction of a color image may also be parameterized by parameter se which controls the amount of saturation, as follows:

$$R_{out}^{i} = f_{new}(I^{i}, \tau)\left(\frac{R^{i}}{I^{i}}\right)^{se} \qquad \text{Equation No. 16a}$$

$$G_{out}^{i} = f_{new}(I^{i}, \tau)\left(\frac{G^{i}}{I^{i}}\right)^{se} \qquad \text{Equation No. 16b}$$

$$B_{out}^{i} = f_{new}(I^{i}, \tau)\left(\frac{B^{i}}{I^{i}}\right)^{se} \qquad \text{Equation No. 16c}$$

Meta-Data

An aspect of present principles is directed to an HDR to HDR inverse tone mapper or mapping operator that is incorporated into a consumer electronics device such as a set-top box, a television, a monitor, a laptop, a phone, a tablet, a smartphone display, etc. An HDR to HDR inverse tone mapping process or information may be supplied as meta-data to the device in order to determine the visual appearance of the device's output. The HDR to HDR inverse tone mapping information may be provided as follows:

The peak luminance of the target display $I_o^{max}$ may be provided to the consumer device (e.g., a television/monitor). If the device is a set-top box, the peak luminance value may be signaled by a connected display device, for example through an HDMI message (see Equation Nos. 3, 6, 7, 8, 13).

The peak luminance of the content $I^{max}$ may be provided as meta-data. The peak luminance value may be provided as a single value per video frame, per shot, or per program (e.g., television episode, movie, commercial). In another example, the value of $I^{max}$ may be interpreted as the peak luminance of the utilized display device (for instance in a post-production house), or the peak luminance of a live camera used in a broadcast scenario (see Equation Nos. 3, 6, 7, 8, 13). In another example, $I^{max}$ is the peak luminance of the compressed HDR content that is broadcast to an end-user.

The parameter η, which is used to calculate the threshold τ, may also be provided as meta-data. In one example, the threshold τ, which determines a cross-over between the linear and non-linear parts of the inverse tone mapping curve, may be sent instead (see Equation No. 9). The cross-over point may also be known as the threshold. The parameter n determines the percentage of pixels to be subjected to non-linear expansion (see Equation Nos. 10, 13).

The parameter α may also be provided as meta-data (see Equation No. 13).

The parameter β that is used in the leaky integration of the threshold for video content may also be included in the meta-data (see Equation No. 14).

By giving a producer of the content (e.g., a director of photography, colorist, studio, etc.) control over each of the parameters η (or τ), n, α and β, the producer's intent can advantageously be better reproduced on a wide variety of displays.

Experimental Results

An algorithm in accordance with present principles (e.g., Equation Nos. 1-16) was tested on HDR images. The experimental results demonstrated that the inverse tone mapper $J(I)$ expands a full range into higher dynamic range, therefore over expanding in both low and high luminance areas, whereas the HDR to HDR inverse tone mapper of present principles $J_{new}(I,\tau)$ keeps most of the pixels unchanged and only expands the very high intensities into a lower range.

When an HDR video frame is processed in accordance with a present principles, a significant portion of all pixels (typically all the black and mid-tones), remained unchanged, and only the highest pixel values expanded. In contrast, linear scaling would have changed all pixel values by the same amount, which all other known inverse tone mapping operators perform.

An advantage of present principles is that the amount of range expansion is strictly limited. The intended output device will possess a high peak luminance, higher than the content received. This means that a comparatively gentle expansion in luminance range will suffice. As such, it is possible to design an inverse tone mapping operator that is global in nature, and in fact leaves many pixel values unchanged. The small amount of expansion is applied only to the lightest pixels. The advantage of this approach is as follows:

Very low computational complexity

Most pixels are reproduced as intended

A much smaller number of pixels receives some expansion in value, such that contrast increase (and thereby loss of the intended contrast) is minimized.

The examples described above may be implemented within the figures described below. FIG. 1 is a diagram depicting an exemplary method 100 for applying an HDR to HDR inverse tone mapper to an image or video content in accordance with present principles.

Method 100 may be performed in any work flow. For example, method 100 may be performed in a post-production studio to aid in the re-grading process or to produce a secondary grade with a higher peak luminance. Alternatively, method 100 may be utilized in connection with an HDR consumer display or may be integrated into a set-top box.

In one example, the method 100 includes block 101 for receiving image or video content. The content may be decoded image or video content. Alternatively, the content may be raw image or video data content. The content may include a picture which may be video images or pictures, e.g., for HDR video. Block 101 may receive information regarding properties of a picture, including linear light RGB information. The content may be captured using tri-chromatic cameras into RGB color values composed of three components (Red, Green and Blue). The RGB color values depend on the tri-chromatic characteristics (color primaries) of the sensor. The content may include image side information such as color primaries of the sensor, maximum and minimum luminance peak of the captured scene. The content may have been previously decoded in accordance with any known standard, such as the High Efficiency Video Coding (HEVC) standard organized by the International Telecommunication (ITU) and the organization Moving Picture Experts Group (MPEG), or in accordance with the H.264 or MPEG-4 Part 10, Advanced Video Coding (MPEG-4 AVC) organized by the International Organization for Standardization/International Electrotechnical Commission (ISO/IEC) Moving Picture Experts Group-4 (MPEG-4). Block 101 may then pass control to block 102, including providing any information regarding the received content.

Block 102 may apply a HDR to HDR inverse tone mapper to the content received from block 101. The HDR to HDR inverse tone mapper may be determined in accordance with present principles. The HDR to HDR inverse tone mapper converts a dynamic range of the content to expand to a dynamic range of the display.

An aspect of present principles is directed to the application of the HDR to HDR inverse tone mapper. The HDR to HDR inverse tone mapper provides the ability to expand a range of luminance values by a very large amount. The application of the HDR to HDR inverse tone mapper results in a limited the amount of range expansion. The intended output device will preferably possess a high peak luminance, higher than the content received. This means that a comparatively gentle expansion in luminance range will suffice. The HDR to HDR inverse tone mapping operator may be global in nature, leaving many pixel values unchanged. The HDR to HDR inverse tone mapping operator may apply a small amount of expansion only to the lightest pixels. There may be the following advantages based on this process:

Very low computational complexity;

Most pixels are reproduced as intended;

A much smaller number of pixels receives some expansion in value, such that contrast increase (and thereby the intended contrast of the content) is minimized.

An aspect of present principles is directed to an HDR to HDR inverse tone mapper includes one or more of the following:

a linear part for dark and mid-tone levels and a nonlinear expanding part for highlights (see, e.g., Equation No. 2);

a curve design of the representation of the HDR to HDR inverse tone mapping curve resulting in a C1 function. (see, e.g., Equation Nos. 3-8);

a content-based knee point/threshold determination (see, e.g., Equation Nos. 10-14) In one example, the HDR to HDR inverse tone mapper may be represented by a linear curve with a small expansion range, where the design of the curve matches smoothness criteria and a curve threshold is determined based on content.

Block 103 may output the resulting content.

Figure 2:
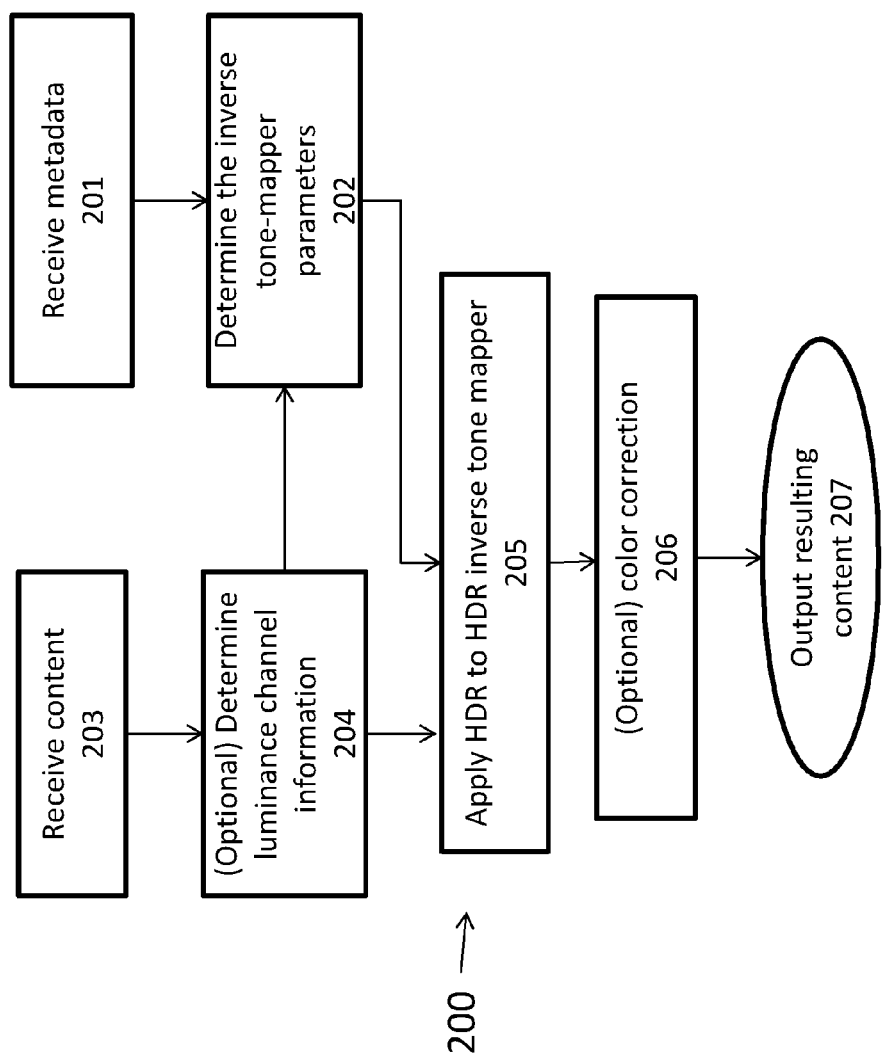
FIG. 2 is a diagram depicting an exemplary method for applying an HDR to HDR inverse tone mapper in accordance with present principles.

FIG. 2 is a diagram depicting an exemplary method 200 for applying a HDR to HDR inverse tone mapper in accordance with present principles.

Method 200 includes a block 201 for receiving metadata, including metadata relating to an HDR to HDR inverse tone mapper. The metadata may include inverse tone mapping curve parameters. Block 201 may then pass control to block 202.

Block 202 may determine the HDR to HDR inverse tone mapping curve parameters. The parameters may include peak luminance of a target display $I_o^{max}$ (see, e.g., Equation Nos. 3, 6, 7, 8, 13), peak luminance of content $I^{max}$ (see, e.g., Equation Nos. 3, 6, 7, 8, 13), parameter η, which is used to calculate the threshold τ (see, e.g., Equation No. 9), parameter n, which determines the percentage of pixels to be subjected to non-linear compression (see, e.g., Equation Nos. 11, 13), parameter α which determines the maximum percentage of the pixels that can be expanded into a part of the dynamic range by the inverse tone mapper (see, e.g., Equation No. 13), and parameter β that is used in the leaky integration of the threshold for video content (see, e.g., Equation No. 14). The parameters may be utilized for determining a content dependent threshold in accordance with the principles described in connection with Equation No. 9, and Equation Nos. 10-14. Block 202 may also determine parameters a,c,d. The parameters may be determined based on criteria that enforce the inverse tone mapping curve to be a C1 function in accordance with Equation Nos. 3-8.

Block 203 may receive content. In one example, the content may be raw image or video content. In another example, the content may be received via an encoded bit-stream and block 203 may decode the bit stream. In another example, the content may have been previously decoded. In one example, block 203 may receive content in accordance with principles outlined in connection with block 101 of FIG. 1. Block 203 may pass control to block 204.

Block 204 may obtain luminance channel information of the content from block 203. In one example, block 204 may apply a preliminary color transform to obtain luminance channel information. In one example, block 204 may determine luminance channel information in accordance with principles described in connection with Equation No. 1. In another example, block 204 may be optional and luminance information may be directly received from block 203.

Block 205 may apply to the content from block 204 (or block 203) an HDR to HDR inverse tone mapper or HDR to HDR inverse tone mapping operator in accordance with present principles. In one example, block 205 may determine the inverse tone mapper curve based on the parameters received block 202. In another example, block 205 may selected a predetermined or stored inverse tone mapper based the parameters received from block 202.

In one example, block 205 may apply and/or determine the HDR to HDR inverse tone mapper in accordance with principles described in connection with block 102 of FIG. 1. In one example, block 205 may apply the HDR to HDR inverse tone mapper to determine an output $I_o$. Block 205 may then pass control to block 206.

Block 206 may perform color correction on the output of block 205. For example, block 206 may perform color correction by scaling the RGB values based on a scale change in the luminance channel in accordance with Equation Nos. 15-a to 16-c. In one example, block 206 may be optional, and control may pass directly from block 205 to block 207. Block 206 may output color corrected content to block 207.

Block 207 may output content processed by the HDR to HDR inverse tone mapper of block 205.

Figure 3:
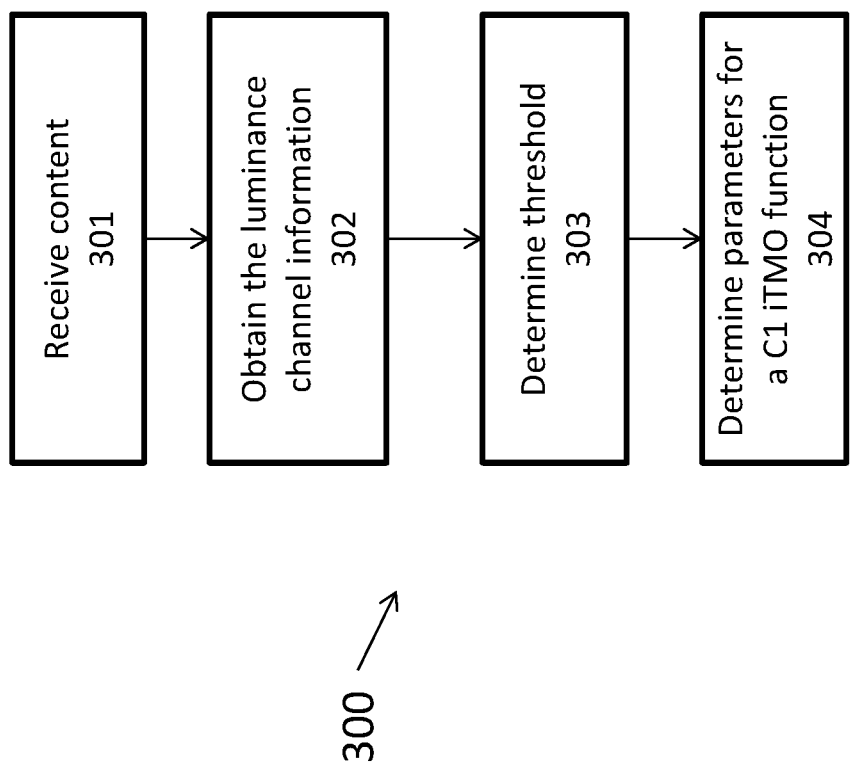
FIG. 3 is a diagram depicting an exemplary method for determining parameters for an HDR to HDR inverse tone mapper in accordance with present principles.

FIG. 3 is a diagram depicting an exemplary method 300 for determining parameters for an HDR to HDR inverse tone mapper in accordance with present principles. The parameters may include parameters for the knee point $\tau_f$ (which may be determined in accordance with principles described in connection with Equation No. 13), and the curve parameters a,c,d (which may be determined in accordance with principles described in connection with Equation Nos. 6-8).

Block 301 may receive content, which may include in whole or in part an image or a frame of a video. Block 301 may receive content in accordance with principles outlined in connection with block 101 of FIG. 1 or block 201 of FIG. 2.

Block 302 may determine luminance channel information (e.g., through a preliminary color transform). In one example, block 302 may determine luminance channel information in accordance with principles described in connection with Equation No. 1. Alternatively, block 302 may be optional and luminance channel information may be directly received from block 301.

Block 303 may determine a threshold of the HDR to HDR inverse tone mapper. In one example, block 303 may determine a threshold that defines the knee point in the inverse tone mapping curve (which may be determined in accordance with principles described in connection with Equation Nos. 2-8). Block 303 may determine the maximum value on input luminance for which the input HDR content is only linearly changed in the output. A content-dependent threshold may be determined based on a minimum luminance value, compared to which less than a priori-fixed percentage of the pixels have higher luminance values. The content dependent threshold may be determined in accordance with the examples previous described in connection with regard to setting threshold τ.

In one example, block 303 may determine the threshold based on a cumulative histogram of the content. Denoting the cumulative histogram for value I by $c^I$, the following condition may be verified:

$$100 \frac{c^{I^{max}} - c^{\tau}}{c^{I^{max}}} \leq n, \qquad \text{Equation No. 17}$$

where n denotes the percentage of the pixels that are allowed to be expanded by the non-linear part of the inverse tone mapping curve. If the condition of Equation No. 17 is satisfied, the initial value of the 80% of the maximum luminance of the input content may be considered as the knee point. If not, the threshold may be obtained using Equation No. 13. This example may be formalized through Equation Nos. 10-13. In another example, the input luminance image is may be provided a threshold value based on the initial value of the 80% of the maximum luminance of the input, and the number of pixels that have values bigger than the threshold are counted as well as the total number of pixels. Equation Nos. 12, 13 are then used to determine the final knee point of the inverse tone mapping curve.

Block 304 may determine parameters for a C1 inverse tone mapping operator function. The C1 function has its first derivative defined and continuous everywhere in the open interval of the input of the derivative function domain. In particular, the inverse tone mapper function is continuous, its derivative is continuous, and the maximum input is mapped to the maximum luminance of the output display. These criteria are formalized in Equation Nos. 3-5 and the consequently determined parameters of the curve are obtained in Equation Nos. 6-8. Block 304 may output the parameter for threshold $\tau_f$, and the curve parameters a,b,c.

Figure 4:
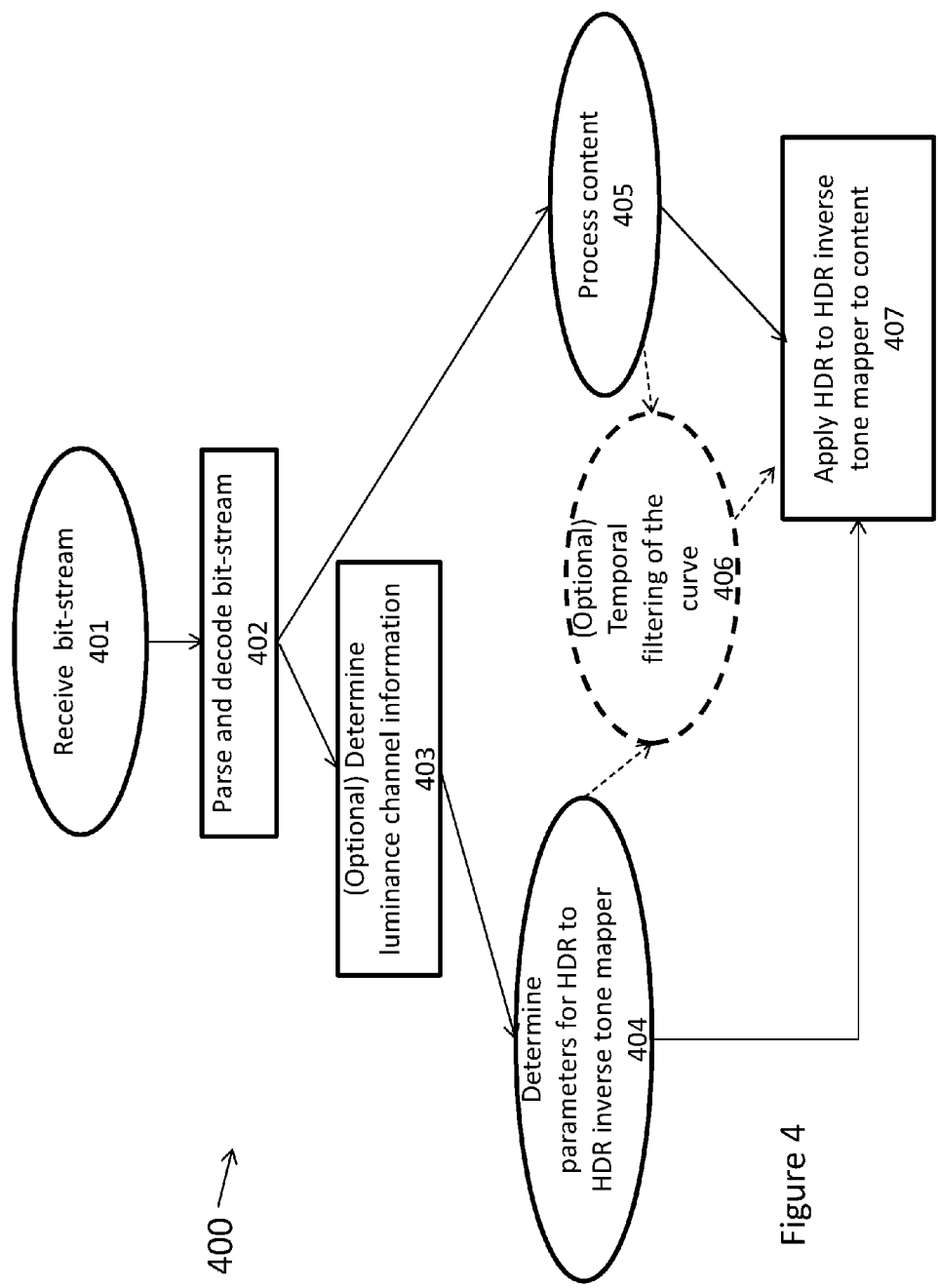
FIG. 4 is a diagram depicting an exemplary method for decoding content and applying an HDR to HDR inverse tone mapper in accordance with present principles.

FIG. 4 is a diagram depicting an exemplary method 400 for decoding content and applying an HDR to HDR inverse tone mapper in accordance with present principles. Method 400 may include a block 401.

Block 401 may receive a bit-stream corresponding to image content, such as a video or image sequence. The received bit-stream may be encoded. Block 401 may pass control to block 402.

Block 402 may parse and decode the bit-stream received from block 401. In one example, the block 402 may parse and decode the bit-stream using HEVC based decoding. Block 402 may then pass control to block 403.

Block 403 may obtain luminance channel information. In one example, block 403 may obtain luminance channel information in accordance with principles described in connection with Equation No. 1. Alternatively, block 403 may be optional and luminance channel information may be directly received from block 402. Block 403 may then pass control to blocks 404 and 405.

Block 404 may determine parameters for an HDR to HDR inverse tone mapper in accordance with present principles. The parameters may be any parameters discussed herewith in accordance with present principles. The parameters may be parsed and decoded from the bit-stream. In one example, the parameters are determined based off of syntax contained in the bit-stream (e.g., an SEI message). The parameters may be parameter threshold $\tau_f$, and curve parameters a,b,c. These parameters can be transmitted through the bit-stream or can be determined at the decoder. For example, the parameters can be determined at the decoder based on the histogram of the luminance information. In one example, block 404 may determine parameters in accordance with method 300 of FIG. 3.

Block 405 may process a content that was parsed and decoded from the bit-stream. For example, block 405 may process a video or image sequence decoded from the bit-stream. In one example, block 504 may process a decoded Y'CbCr video signal. In one example, block 504 may convert an Y'CbCr video signal to a R'G'B' video signal. In another example, block 504 may process a R'G'B' video signal.

Block 406 may perform optional temporal filtering of the inverse tone mapper curve. Block 406 may perform leaky integration to address potential flicker problems. For video content, the estimated thresholds for consecutive frames can be different. To prevent flicker (i.e., noticeable variations in the intensity of the consecutive frames) of the video content, a correction of the estimated $\tau_f$ values for every new frame of the video may be determined. Leaky integration can be applied to the parameter $\tau_{new}^t$ for frame t, which is estimated using $\tau_f^t$ calculated as shown in the previous section, and the estimated leaky parameter for the previous frame, i.e., $\tau_{new}^{t-1}$. In one example, this may be performed in accordance with principles described in connection with Equation No. 14. The input of block 406 is the luminance channel information and the final threshold of the previous frame. The curve in block 406 corresponds to the inverse tone mapping curve. Block 406 is optional but strongly recommended to remove possible source of flicker in the output video. The output of the block 406 is the leaky determination of the threshold and the updated parameters of the inverse tone mapping curve using the principles described in connection with Equation Nos. 6-8 and 14.

Block 407 may apply the HDR to HDR inverse tone mapper to the content from either block 405 or, if temporal filtering is applied, block 406. Block 407 applies the HDR to HDR inverse tone mapper in accordance with present principles. For a video signal, the HDR to HDR inverse tone mapper may be performed frame by frame using the parameters determined by block 404. In one example block 407 may apply the HDR to HDR inverse tone mapper in accordance with principles described in connection with block 102 in FIG. 1 and block 205 in FIG. 2. In one example, block 407 may create or may receive a Look Up Table (LUT) with tabulated values (e.g., based on Equation Nos. 13-14) and then applying the LUT to the content.

Figure 5:
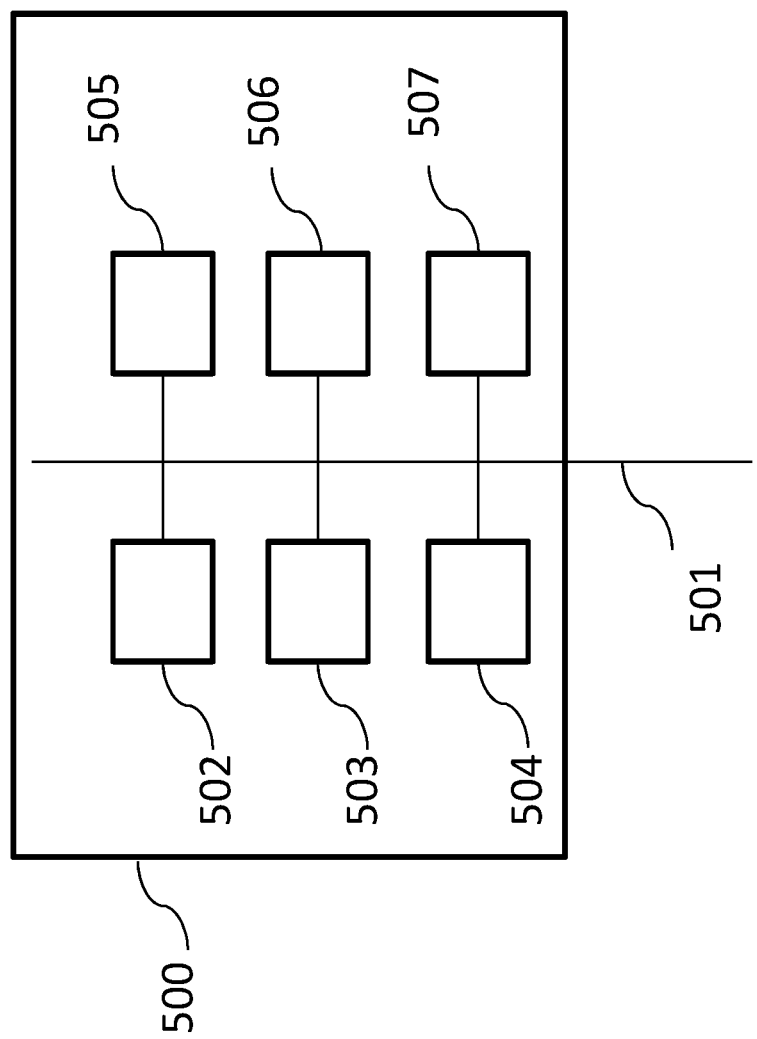
FIG. 5 is a diagram depicting an exemplary apparatus in accordance with present principles.

FIG. 5 represents an exemplary architecture of an apparatus 500 which may be configured to implement methods described in relation with FIG. 1-4 and Equation Nos. 1-17. In one example, FIG. 5 represents an apparatus that may be configured to implement the methods according to present principles, including principles described in relation to FIGS. 1-4. In one example, FIG. 5 represents an apparatus that may be configured to implement the decoding method according to present principles, including principles described in relation to FIG. 4.

Apparatus 500 comprises following elements that are linked together by a data and address bus 501:
  a microprocessor 502 (or CPU), which is, for example, a DSP (or Digital Signal Processor);
  a ROM (or Read Only Memory) 503;
  a RAM (or Random Access Memory) 504;
  an I/O interface 505 for reception of data to transmit, from an application; and
  a battery 506 (or other suitable power source).

According to a variant, the battery 506 is external to the apparatus. In each of mentioned memory, the word «register» used in the specification can correspond to area of small capacity (some bits) or to very large area (e.g. a whole program or large amount of received or decoded data). ROM 503 comprises at least a program and parameters. Algorithm of the methods according to the invention is stored in the ROM 503. When switched on, the CPU 502 uploads the program in the RAM and executes the corresponding instructions.

RAM 504 comprises, in a register, the program executed by the CPU 502 and uploaded after switch on of the apparatus 500, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or an apparatus), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific example of encoding or encoder, the image or picture I is obtained from a source. For example, the source belongs to a set comprising:

a local memory (503 or 504), e.g. a video memory or a RAM (or Random Access Memory), a flash memory, a ROM (or Read Only Memory), a hard disk;

a storage interface (505), e.g. an interface with a mass storage, a RAM, a flash memory, a ROM, an optical disc or a magnetic support;

a communication interface (505), e.g. a wireline interface (for example a bus interface, a wide area network interface, a local area network interface) or a wireless interface (such as a IEEE 802.11 interface or a Bluetooth® interface); and an image capturing circuit (e.g. a sensor such as, for example, a CCD (or Charge-Coupled Device) or CMOS (or Complementary Metal-Oxide-Semiconductor)).

According to different embodiments of the decoding or decoder, the decoded image Î is sent to a destination; specifically, the destination belongs to a set comprising:

a local memory (503 or 504), e.g. a video memory or a RAM, a flash memory, a hard disk;

a storage interface (505), e.g. an interface with a mass storage, a RAM, a flash memory, a ROM, an optical disc or a magnetic support;

a communication interface (505), e.g. a wireline interface (for example a bus interface (e.g. USB (or Universal Serial Bus)), a wide area network interface, a local area network interface, a HDMI (High Definition Multimedia Interface) interface) or a wireless interface (such as a IEEE 802.11 interface, Wi-Fi® or a Bluetooth® interface); and a display.

According to different examples of encoding or encoder, the bitstream BF and/or F are sent to a destination. As an example, one of bitstream F and BF or both bitstreams F and BF are stored in a local or remote memory, e.g. a video memory (504) or a RAM (504), a hard disk (503). In a variant, one or both bitstreams are sent to a storage interface (505), e.g. an interface with a mass storage, a flash memory, ROM, an optical disc or a magnetic support and/or transmitted over a communication interface (505), e.g. an interface to a point to point link, a communication bus, a point to multipoint link or a broadcast network.

According to different examples of decoding or decoder, the bitstream BF and/or F is obtained from a source. Exemplarily, the bitstream is read from a local memory, e.g. a video memory (504), a RAM (504), a ROM (503), a flash memory (503) or a hard disk (503). In a variant, the bitstream is received from a storage interface (505), e.g. an interface with a mass storage, a RAM, a ROM, a flash memory, an optical disc or a magnetic support and/or received from a communication interface (505), e.g. an interface to a point to point link, a bus, a point to multipoint link or a broadcast network.

According to different examples, apparatus 500 being configured to implement an encoding method in accordance with present principles, belongs to a set comprising:

a mobile device;
a communication device;
a game device;
a tablet (or tablet computer);
a laptop;
a still image camera;
a video camera;
an encoding chip;
a still image server; and
a video server (e.g. a broadcast server, a video-on-demand server or a web server).

According to different examples, apparatus 500 being configured to implement a decoding method in accordance with present principles, belongs to a set comprising:

a mobile device;
a communication device;
a game device;
a set top box;
a TV set;
a tablet (or tablet computer);
a laptop;
a display and
a decoding chip.

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example, or to carry as data the actual syntax-values written by a described example. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

Numerous specific details have been set forth herein to provide a thorough understanding of the present invention. It will be understood by those skilled in the art, however, that the examples above may be practiced without these specific details. In other instances, well-known operations, components and circuits have not been described in detail so as not to obscure the present invention. It can be appreciated that the specific structural and functional details disclosed herein may be representative and do not necessarily limit the scope of the present invention.

Various examples of the present invention may be implemented using hardware elements, software elements, or a combination of both. Some examples may be implemented, for example, using a computer-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus and constituents included therein, for example, a processor, an encoder and a decoder, may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

According to different embodiments, the parameterized transfer function is signaled in the picture encoded or decoded according to the invention, or in a stream including the picture. In some embodiments, an information representative of the parameterize transfer function is signaled in the picture or in the stream including the picture. This information is used by a decoding method or decoder to identify the parameterized transfer function that is applied according to the invention. In one embodiment, this information includes an identifier that is known on encoding and decoding side. According to other embodiments, this information includes parameters used as a basis for parameterized transfer functions. According to a variant of the invention, this information comprises an indicator of the parameters in the picture or in a bit-stream including the picture, based on a set of defined values. According to a variant of the invention, this information comprises an indication based on whether the parameters are signaled explicitly or whether the parameters are signaled implicitly based on a set of defined values. According to different variants of the invention, this information is included in at least one syntax element included in at least one of a Picture Parameter Set (PPS), a Sequence Parameter Set (SPS), a Supplemental Enhancement Information (SEI) message, a Video Usability Information (VUI), Consumer Electronics Association (CEA) message, and a header.

The invention claimed is:

1. A method for inverse tone mapping of a high dynamic range image, the method comprising
obtaining a luminance component of the high dynamic range image;
determining an HDR to HDR inverse tone mapper curve; and
determining a tone expanded image by applying the HDR to HDR inverse tone mapper curve to the luminance component of the high dynamic range image;
wherein the HDR to HDR inverse tone mapper curve comprises a linear part for dark and mid-tone levels, and an expanding non-linear part for highlights and includes a first threshold $\tau_f$ for determining the transition between the linear part and the non-linear part,
wherein the first threshold $\tau_f$ is determined based on the following:

$$\tau_f = \begin{cases} \tau & \rho \leq n \\ \dfrac{\tau}{\alpha - n}(\alpha - \rho) & n < \rho \leq \alpha \\ 0 & \rho > \alpha \end{cases}$$

where $I_o^{max}$ is a maximum luminance value for the tone expanded image, n is the percentage of pixels in the image that corresponds to highlights, α denotes the maximum percentage of pixels that can be non-linearly expanded to only a small part of the dynamic range by the inverse tone-manner curve without introducing artifacts in the tone expanded image, and where $$\rho = 100 \frac{c^{I^{max}} - c^{\tau}}{c^{I^{max}}},$$

where $c^{I^{max}}$ and $c^{\tau}$ denote the cumulative histograms of luminance values for respectively the peak luminance $I^{max}$ of the content and a luminance value corresponding to a second threshold τ.

2. An apparatus for inverse tone mapping a high dynamic range image, the apparatus comprising a processor configured for:
obtaining a luminance component of the high dynamic range image,
determining an HDR to HDR inverse tone mapper curve, and
determining a tone decompressed image by applying the HDR to HDR inverse tone mapper curve to the luminance component of the high dynamic range image;
wherein the HDR to HDR inverse tone mapper curve comprises a linear part for dark and mid-tone levels, and an expanding non-linear part for highlights and includes a first threshold $\tau_f$ for determining the transition between the linear part and the non-linear part,
wherein the first threshold $\tau_f$ is determined based on the following:

$$\tau_f = \begin{cases} \tau & \rho \le n \\ \frac{\tau}{\alpha - n}(\alpha - \rho) & n < \rho \le \alpha \\ 0 & \rho > \alpha \end{cases}$$

where $I_o^{max}$ is a maximum luminance value for the tone expanded image, n is the percentage of pixels in the image that corresponds to highlights, α denotes the maximum percentage of pixels that can be non-linearly expanded to only a small part of the dynamic range by the inverse tone-manner curve without introducing artifacts in the tone expanded image, and where $$\rho = 100 \frac{c^{I^{max}} - c^{\tau}}{c^{I^{max}}},$$

where $c^{I^{max}}$ and $c^{\tau}$ denote the cumulative histograms of luminance values for respectively the peak luminance $I^{max}$ of the content and a luminance value corresponding to a second threshold τ.

3. The method of claim 1, further comprising determining a scaling factor that linearly scales input values for dark and mid-tone levels based on content.

4. The method of claim 3, wherein said scaling factor determining is based on a histogram parameter that measures the uniformity of the luminance histogram of said image corresponding to mid-tones.

5. The method of claim 3, wherein said scaling factor determining is based on a dynamic range expansion ratio dividing the maximum luminance value for the tone expanded image by the peak luminance of the content.

6. The method of claim 1, further comprising criteria to enforce continuity and smoothness of the HDR to HDR inverse tone mapper curve.

7. The method of claim 1, wherein the high dynamic range image is part of a high dynamic range video, and
wherein the application of the HDR to HDR inverse tone mapper curve includes applying information from prior video frames to achieve temporal stability.

8. The method of claim 7, wherein the information from prior video frames is applied using leaky integration based on the threshold.

9. The method of claim 1, further comprising
signaling information representative of the HDR to HDR inverse tone mapper curve.

10. The method of claim 9, wherein the signaling is performed using at least one syntax element included in at least one of a Picture Parameter Set (PPS), a Sequence Parameter Set (SPS), a Supplemental Enhancement Information (SEI) message, a Video Usability Information (VUI), Consumer Electronics Association (CEA) message, and a header.

11. A method for tone mapping a high dynamic range image, the method comprising
obtaining a luminance component of the high dynamic range image;
determining an HDR to HDR inverse tone mapper curve;
determining a tone decompressed image by applying the HDR to HDR inverse tone mapper curve to the luminance component of the high dynamic range image;
wherein the HDR to HDR inverse tone mapper curve is multi-segmented, includes at least a segment that is not linear and at least a segment that is linear, and includes a first threshold $\tau_f$ for determining the transition between the linear segment and the non-linear segment,
wherein the first threshold $\tau_f$ is determined based on the following:

$$\tau_f = \begin{cases} \tau & \rho \le n \\ \frac{\tau}{\alpha - n}(\alpha - \rho) & n < \rho \le \alpha \\ 0 & \rho > \alpha \end{cases}$$

where $I_o^{max}$ is a maximum luminance value for the tone decompressed image, n is the percentage of pixels in the image that corresponds to the non-linear segment, α denotes the maximum percentage of pixels that can be non-linearly tone decompressed to only a small part of the dynamic range by the inverse tone-mapper curve without introducing artifacts in the tone decompressed image, and where $$\rho = 100 \frac{c^{I^{max}} - c^{\tau}}{c^{I^{max}}},$$

where $c^{I^{max}}$ and $C^{\tau}$ denote the cumulative histograms of luminance values for respectively the peak luminance $I^{max}$ of the content and a luminance value corresponding to a second threshold τ.

12. The method of claim 11,
wherein the linear segment is directed to at least one selected from a group of darks, mid-tones, and highlights, and wherein the non-linear segment is directed to at least one selected from a group of darks, mid-tones, and highlights.

13. The apparatus of claim 2, wherein the processor is further configured for determining a scaling factor that linearly scales input values for dark and mid-tone levels based on content.

14. The apparatus of claim 13, wherein said scaling factor determining is based on a histogram parameter that measures the uniformity of the luminance histogram of said image corresponding to mid-tones.

15. The apparatus of claim 13, wherein said scaling factor determining is based on a dynamic range expansion ratio dividing the maximum luminance value for the tone expanded image by the peak luminance of the content.

16. The apparatus of claim 2, further comprising criteria to enforce continuity and smoothness of the HDR to HDR inverse tone mapper curve.

17. The apparatus of claim 2,
wherein the high dynamic range image is part of a high dynamic range video, and
wherein the application of the HDR to HDR inverse tone mapper curve includes applying information from prior video frames to achieve temporal stability.

18. The apparatus of claim 17, wherein the information from prior video frames is applied using leaky integration based on the threshold.

19. The apparatus of claim 2, further comprising signaling information representative of the HDR to HDR inverse tone mapper curve.

20. The apparatus of claim 19, wherein the signaling is performed using at least one syntax element included in at least one of a Picture Parameter Set (PPS), a Sequence Parameter Set (SPS), a Supplemental Enhancement Information (SEI) message, a Video Usability Information (VUI), Consumer Electronics Association (CEA) message, and a header.

* * * * *